US012585102B2

(12) United States Patent
Nitta et al.

(10) Patent No.: US 12,585,102 B2
(45) Date of Patent: Mar. 24, 2026

(54) SLIDE HOLDER AND SLIDE-HOLDER SUPPORT STRUCTURE

(71) Applicant: K.K. CYBO, Tokyo (JP)

(72) Inventors: Nao Nitta, Tokyo (JP); Takeaki Sugimura, Yokohama (JP); Miki Kanematsu, Tokyo (JP)

(73) Assignee: K.K. CYBO, Tokyo (JP)

( * ) Notice: Subject to any disclaimer, the term of this patent is extended or adjusted under 35 U.S.C. 154(b) by 378 days.

(21) Appl. No.: 18/546,247

(22) PCT Filed: Feb. 28, 2022

(86) PCT No.: PCT/JP2022/008156
§ 371 (c)(1),
(2) Date: Aug. 11, 2023

(87) PCT Pub. No.: WO2022/209509
PCT Pub. Date: Oct. 6, 2022

(65) Prior Publication Data
US 2024/0126065 A1 Apr. 18, 2024

(30) Foreign Application Priority Data

Apr. 2, 2021 (JP) ................................. 2021-063365

(51) Int. Cl.
*G02B 21/34* (2006.01)
*G02B 21/26* (2006.01)
(52) U.S. Cl.
CPC ............. *G02B 21/26* (2013.01); *G02B 21/34* (2013.01)

(58) Field of Classification Search
CPC . G02B 21/26; G02B 21/34; B01L 2300/0822; G01N 1/312; Y10T 436/112499; Y10T 436/25
See application file for complete search history.

(56) References Cited

U.S. PATENT DOCUMENTS 6,118,582 A * 9/2000 Del Buono ......... B01L 3/50855
359/398
9,488,822 B2 * 11/2016 Machida ................ G01N 1/312
(Continued)

FOREIGN PATENT DOCUMENTS

| CN | 210514779 U | 5/2020 |
| JP | H0596818 U | 12/1993 |
| JP | H06347702 A | 12/1994 |

(Continued)

OTHER PUBLICATIONS

International Search Report for PCT/JP2022/008156, issued May 17, 2022.

*Primary Examiner* — Mustak Choudhury
(74) *Attorney, Agent, or Firm* — United IP Counselors, LLC

(57) ABSTRACT

Provided are stackable slide holders and a stage on which the slide holders can be placed. A slide holder that can hold a plurality of glass slides has: a first longer side portion that has elastic portions that fix glass slides, and has a tapered surface on the inner periphery side of the bottom surface; a second longer side portion that is positioned opposite the first longer side portion; and a first shorter side portion and a second shorter side portion that connect ends of the first longer side portion and second longer side portion, and are positioned opposite to each other.

19 Claims, 11 Drawing Sheets

(56) References Cited

U.S. PATENT DOCUMENTS

| 2007/0153369 A1* | 7/2007 | Schutze | ................. | B01L 9/523 |
| | | | | 359/368 |
| 2012/0075695 A1* | 3/2012 | DeBlasis | .................. | B01L 9/52 |
| | | | | 359/391 |

FOREIGN PATENT DOCUMENTS

| JP | 2005128378 A | 5/2005 |
| JP | 2020504328 A | 2/2020 |

* cited by examiner

SLIDE HOLDER AND SLIDE-HOLDER SUPPORT STRUCTURE

CROSS-REFERENCE TO RELATED APPLICATIONS

This application is a National Stage Entry application of PCT International Application No. PCT/JP2022/008156, filed on Feb. 28, 2022, which claims the priority benefit of Japanese Patent Application No. 2021-063365, filed on Apr. 2, 2021, the entire contents of both of which are hereby incorporated by reference.

BACKGROUND

1. Technical Field

The present invention relates to slide holders for capturing, with a microscope, images of glass slides onto which a subject object such as cells has been applied, and to a slide-holder support structure.

2. Description of the Background

There are conventionally known metallic slide holders that hold glass slides on which a subject object has been applied (e.g. Japanese Unexamined Patent Application Publication No. 2020-504328).

BRIEF SUMMARY

The conventional metallic slide holders are not designed on the assumption that they are used in a state where many slide holders are stacked one on another. Accordingly, when images of glass slides are captured with a microscope, the number of slide holders that can be mounted inside an apparatus is limited. In addition, since slide holders themselves are expensive, it is not realistic to store the slide holders for a long period in a state where glass slides are attached to those slide holders, and glass slides need to be attached every time measurement is performed.

An object of the present invention is to provide stackable slide holders, and a slide-holder support structure on which the slide holders can be placed.

A first aspect of the present invention is a slide holder that can hold a plurality of glass slides, the slide holder including:

a first longer side portion that has elastic portions that fix the glass slides, and has a tapered surface on an inner periphery side of a bottom surface;

a second longer side portion that is positioned opposite the first longer side portion; and a first shorter side portion and a second shorter side portion that connect ends of the first longer side portion and the second longer side portion, and are positioned opposite to each other.

A second aspect of the present invention is a slide-holder support structure on which a slide holder can be placed on a frame-shaped stage, in which the slide-holder support structure has, on an inner periphery, a support section that supports the slide holder at the recess, and in a state where the slide holder is placed, the bottom surface of the slide holder and a bottom surface of the stage coincide with each other.

The present invention can provide stackable slide holders, and a slide-holder support structure on which the slide holders can be placed.

DETAILED DESCRIPTION

Embodiment

Hereinbelow, a slide holder 1 according to an embodiment is explained.

Figure 1:
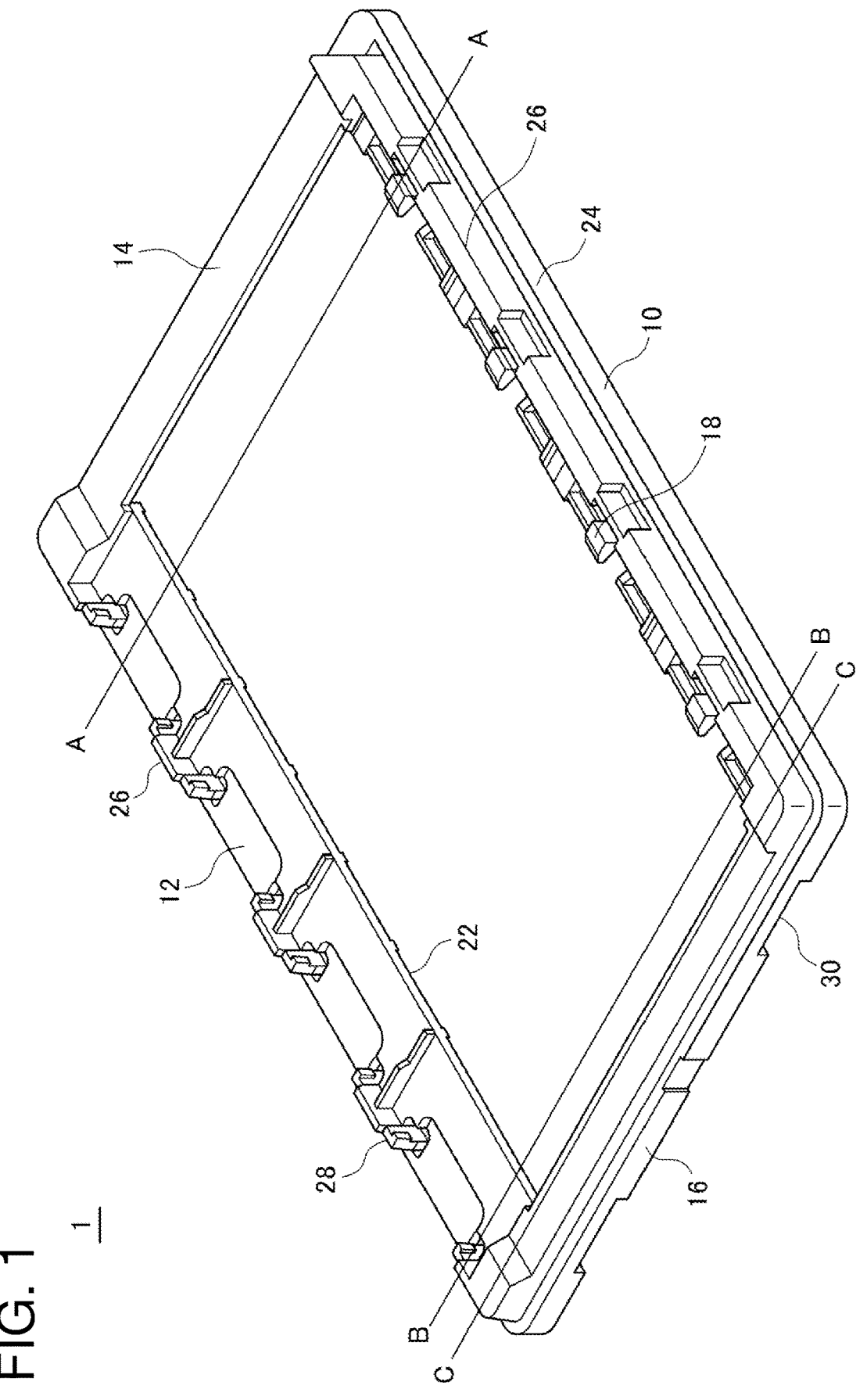
FIG. 1 is a perspective view of a slide holder according to an embodiment.
Figure 2:
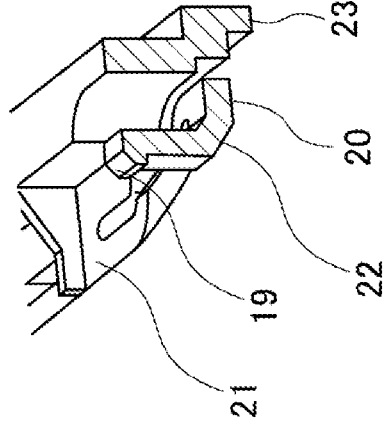
FIG. 2 is a perspective cross-sectional view taken along line A-A in FIG. 1.
Figure 2:
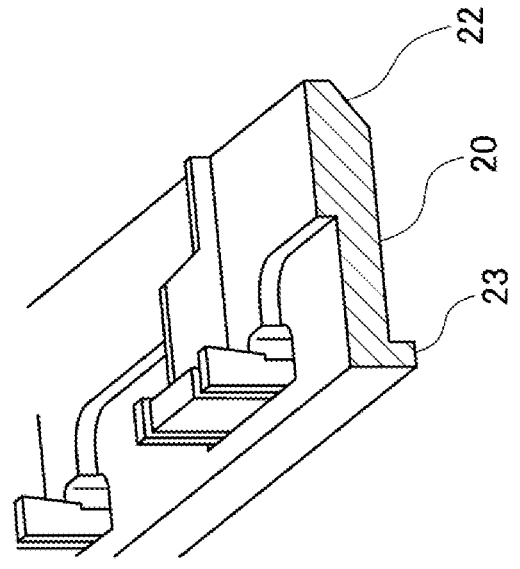
Figure 3:
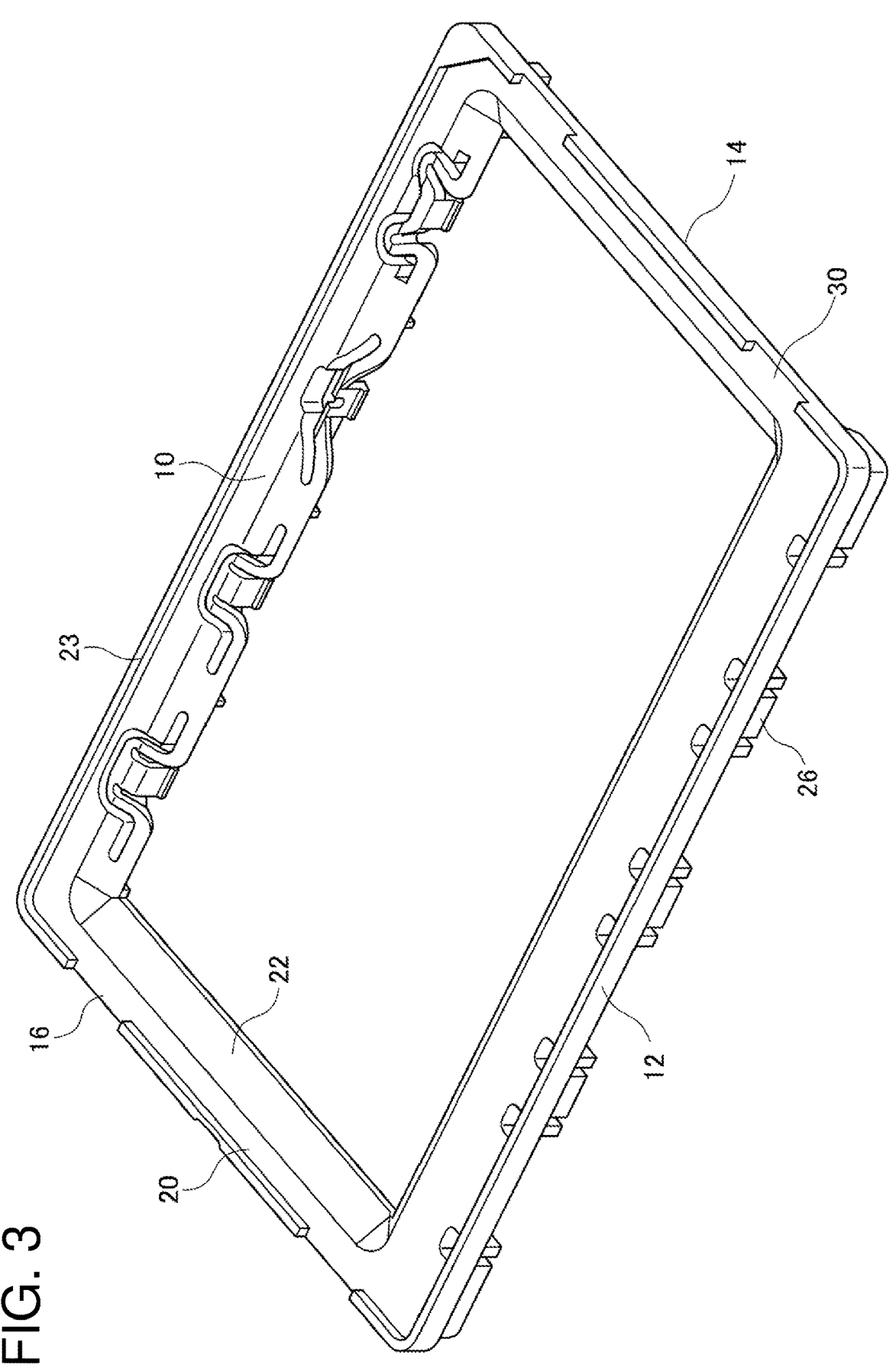
FIG. 3 is a perspective view of the bottom surface of the slide holder according to the embodiment.

FIG. 1 is a perspective view of the slide holder 1 according to the embodiment. FIG. 2 is a perspective cross-sectional view taken along line A-A in FIG. 1. FIG. 3 is a perspective view of the bottom surface of the slide holder 1 according to the embodiment. The slide holder 1 according to the embodiment can hold a plurality of glass slides 2 (e.g. four slide glasses 2).

As depicted in FIG. 1 to FIG. 3, the slide holder 1 has a first longer side portion 10, a second longer side portion 12, a first shorter side portion 14 and a second shorter side portion 16. The first longer side portion 10 has elastic portions 18 that fix the glass slides 2. The first longer side portion 10 according to the present embodiment has a plurality of the elastic portions 18 (e.g. four elastic portions 18). For example, the elastic portions 18 are structures whose portions for fixing the glass slides 2 are elastically deformed and can move due to springs upon receiving external force, and bias the glass slides 2 along a direction from the first longer side portion 10 to the second longer side portion 12.

The second longer side portion 12 is positioned opposite the first longer side portion 10. The first shorter side portion 14 connects ends of the first longer side portion 10 and second longer side portion. The second shorter side portion 16 connects the other ends of the first longer side portion 10 and second longer side portion. The first shorter side portion 14 and the second shorter side portion 16 are positioned opposite to each other.

The first longer side portion 10, the second longer side portion 12, the first shorter side portion 14 and the second shorter side portion 16 are formed integrally. Thereby, the frame-shaped slide holder 1 is formed. The first longer side portion 10, the second longer side portion 12, the first shorter side portion 14 and the second shorter side portion 16 include resin (ABS resin, polypropylene, polycarbonate, polyphthalamide, polyoxymethylene, polymethylmethacrylate, polybutylene terephthalate, etc.). The first longer side portion 10, the second longer side portion 12, the first shorter side portion 14 and the second shorter side portion 16 are injection-molded. At this time, the resin thickness of the entire frame-shaped slide holder 1 is preferably uniform.

The second longer side portion 12 has claws 28 that receive the glass slides 2. The second longer side portion 12 according to the present embodiment has a plurality of the claws 28 (e.g. eight claws 28). The claws 28 receive the glass slides 2 biased by the elastic portions 18. By pressing the glass slides 2 in under the claws 28, and causing the elastic portions 18 to press the glass slides 2 against the claws 28, the glass slides 2 are held by the slide holder 1. In the present embodiment, two (a pair of) claws 28 correspond to one elastic portion 18.

The first longer side portion 10 has a tapered surface 22 at the inner periphery side of a bottom surface 20. Preferably, each of the first longer side portion 10, the second longer side portion 12, the first shorter side portion 14 and the second shorter side portion 16 has the tapered surface 22 on the inner periphery side of the bottom surface 20. The angles formed by the respective bottom surfaces 20 and tapered surfaces 22 in the first longer side portion 10, the second longer side portion 12, the first shorter side portion 14 and the second shorter side portion 16 are preferably the same. The angles formed by the respective bottom surfaces 20 and tapered surfaces 22 are preferably equal to or smaller than 60 degrees.

The first longer side portion 10 holds the glass slides 2 by pressing the glass slides 2 toward the second longer side portion 12 by using elastic force of the elastic portions 18. In addition, preferably, the first longer side portion 10 has a glass slide placement surface 21 on its upper surface. The glass slide placement surface 21 holds the glass slides 2 such that the glass slides 2 do not fall off downward. In addition, in order to prevent the held glass slides 2 from coming off upward, preferably, projections 19 are formed at the upper portions of the elastic portions 18.

Note that since the sizes of the glass slides 2 vary, preferably, the elastic portions 18 can appropriately hold the glass slides 2 with various sizes. Accordingly, the range of possible displacement amounts in terms of strokes of the elastic portions 18 are preferably greater than the variations of the lengths of the glass slides 2 in the longitudinal-axis direction. For example, in a case where the variations of the sizes of the glass slides 2 are ±0.5 millimeters, the strokes of the elastic portions 18 are preferably equal to or greater than one millimeter.

In order for the elastic portions 18 to have sufficient strokes, for example, the elastic portions 18 can have spring structures overhanging from the glass slide placement surface 21. Since the spring structures can be given sufficient lengths, displacement due to the pliability or twists of the material can be gained, and the strokes of the elastic portions 18 increase.

Note that in a case where the spring structures of the elastic portions 18 are structures overhanging from the glass slide placement surface 21, the glass slide placement surface 21 and the spring structures of the elastic portions 18 preferably overlap the tapered surfaces 22 when seen in a plan view.

In addition, the spring structures twist and are deformed when the glass slides 2 are held. Accordingly, sections interconnecting the first longer side portion 10 and the spring structures are preferably lower than the glass slide placement surface 21. Thereby, even if the interconnecting sections are deformed upward along with twists of the spring structures, and this moves the glass slides 2 upward, interference of the spring structures with the glass slides 2 can be inhibited.

Each of the first longer side portion 10, the second longer side portion 12, the first shorter side portion 14 and the second shorter side portion 16 has a pedestal portion 24 and a protrusion 26. The pedestal portions 24 form the outer frame of the slide holder 1. Each pedestal portion 24 has a wall portion 23 at the bottom surface 20 thereof. The protrusions 26 protrude above the first longer side portion 10, the second longer side portion 12, the first shorter side portion 14 and the second shorter side portion 16. In the frame-shaped slide holder 1, each protrusion 26 has an outline shape smaller than the corresponding wall portion 23.

At least one of the first longer side portion 10, the second longer side portion 12, the first shorter side portion 14 and the second shorter side portion 16 has recesses 30 at its wall portion 23. In the present embodiment, the wall portion 23 of each of the first shorter side portion 14 and the second shorter side portion 16 has two recesses 30. As depicted in FIG. 3, each wall portion 23 preferably has a height at the recesses 30 which is the same as the height of the bottom surface 20.

Note that the number of the recesses 30 is not limited particularly. In addition, the wall portions 23 of the first longer side portion 10 and second longer side portion 12 may have recesses 30 or the wall portions 23 of all of the first longer side portion 10, the second longer side portion 12, the first shorter side portion 14 and the second shorter side portion 16 may have recesses 30.

Figure 4:
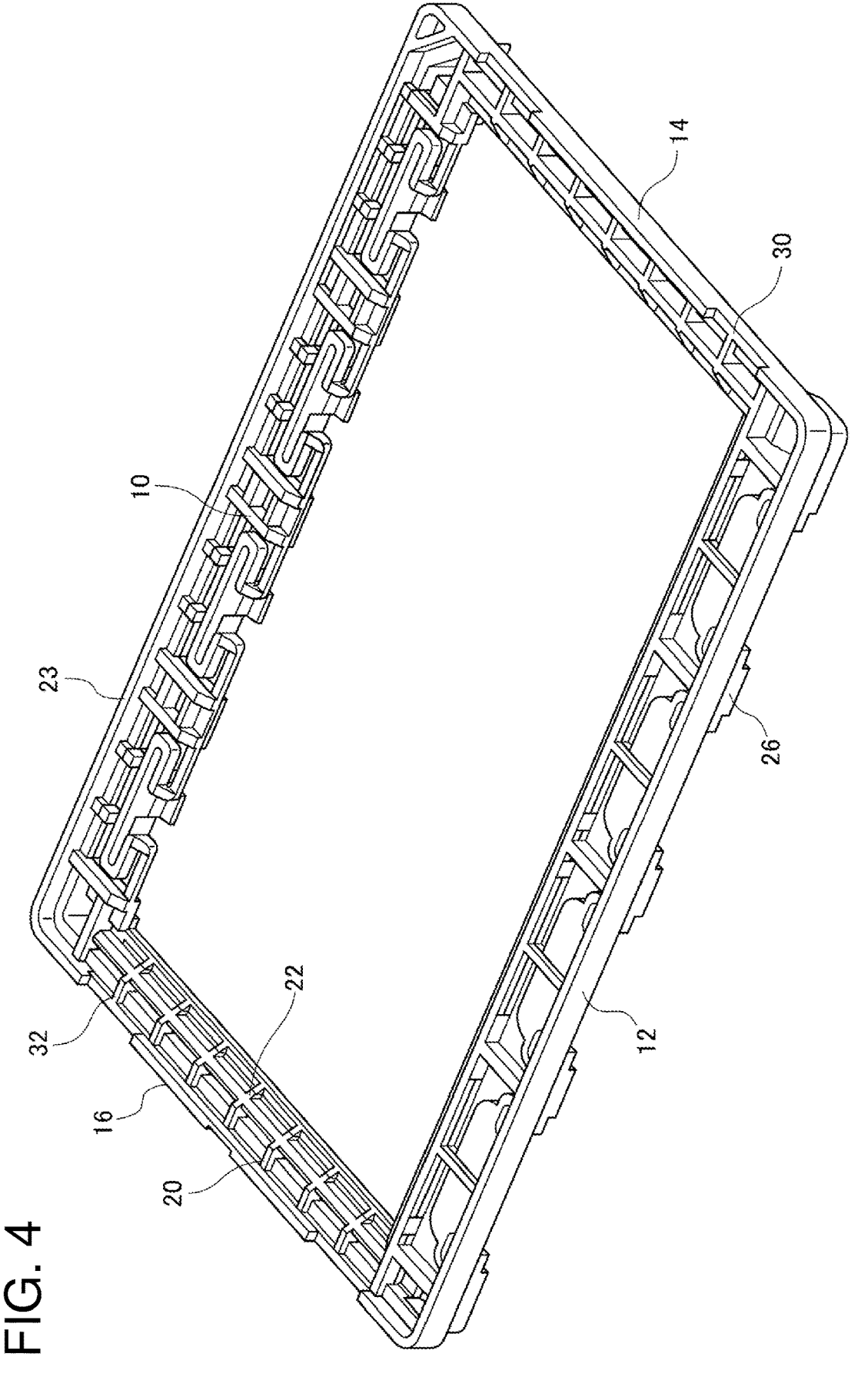
FIG. 4 is a perspective view of the bottom surface of the slide holder according to a modification example.

FIG. 4 is a perspective view of the bottom surface of the slide holder 1 according to a modification example. The slide holder 1 according to the modification example depicted in FIG. 4 is the same in terms of basic profile as the slide holder 1 according to the embodiment depicted in FIG. 3, but is different in terms of specific configuration of the bottom surfaces 20 and the tapered surfaces 22. The slide holder 1 according to the modification example has a plurality of ribs 32 at the bottom surfaces 20. Thereby, the strength of the slide holder 1 is enhanced while the thickness of the slide holder 1 is kept thin. In addition, by making the thickness of the resin of the slide holder 1 uniform, the fluidity of the resin at a time of injection molding becomes uniform.

Figure 5:
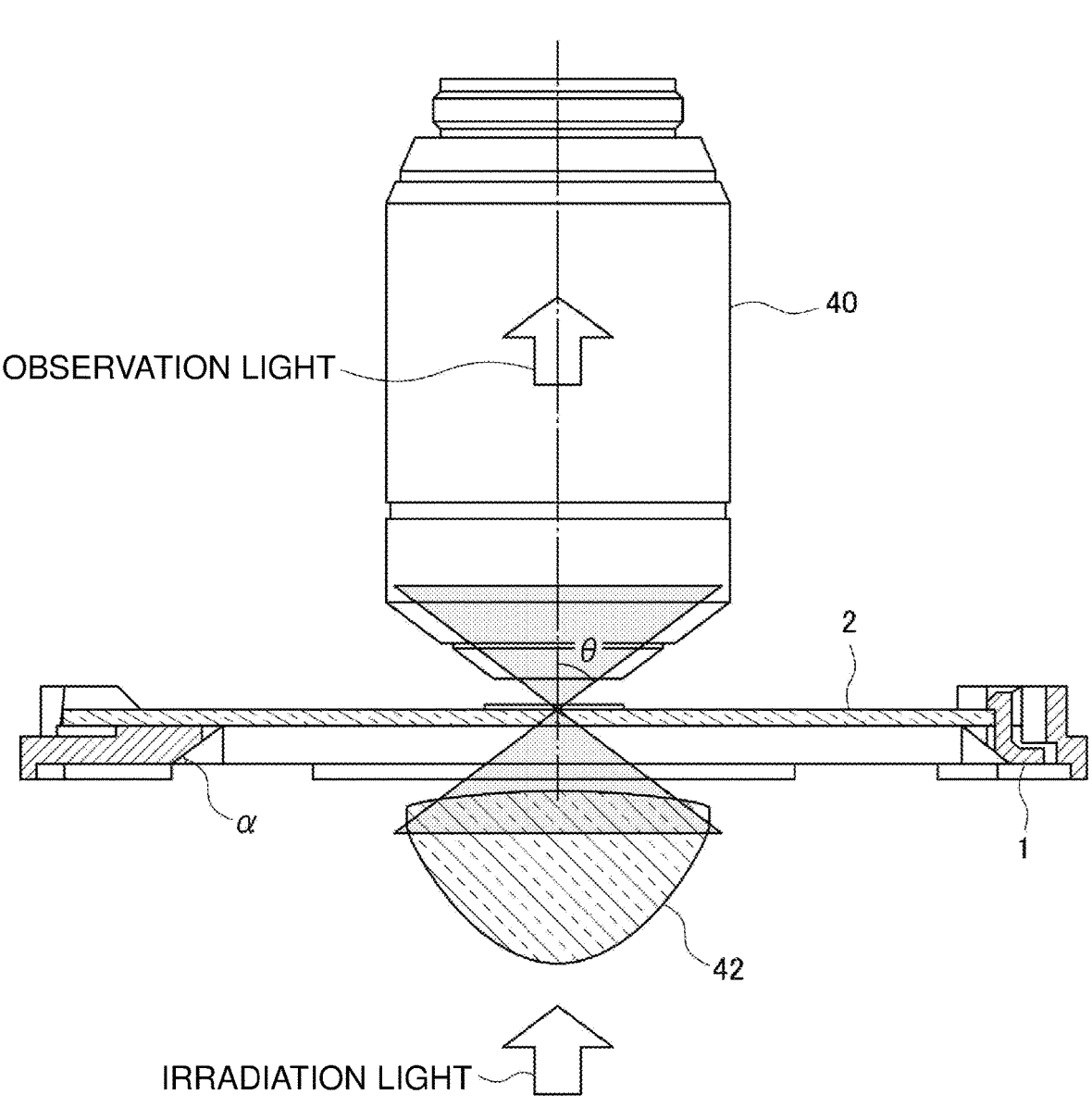
FIG. 5 is a cross-sectional view of the slide holder holding a glass slide at a time of image capturing.

FIG. 5 is a cross-sectional view of the slide holder 1 according to the embodiment holding a glass slide 2 at a time of image capturing. Irradiation light is condensed onto the glass slide 2 held by the slide holder 1 by a transmission illumination system 42, and the light is observed with a dry-type objective lens 40. The transmission illumination system 42 has a condenser lens, for example. Here, a maximum incident angle $\theta$ of the light into the objective lens 40 and a numerical aperture NA of the objective lens 40 satisfy a relationship of $NA = n \times \sin \theta$ if the refractive index of a medium between the objective lens 40 and a sample is defined as n. If the wavelength of the light is defined as λ, an optical resolution σ satisfies a relationship of σ=0.61λ/sin θ. As the value of the optical resolution σ decreases, the observable intricateness of subjects increases. Accordingly, the maximum incident angle θ of the light into the objective lens 40 is preferably increased.

Figures 6A, 6B:
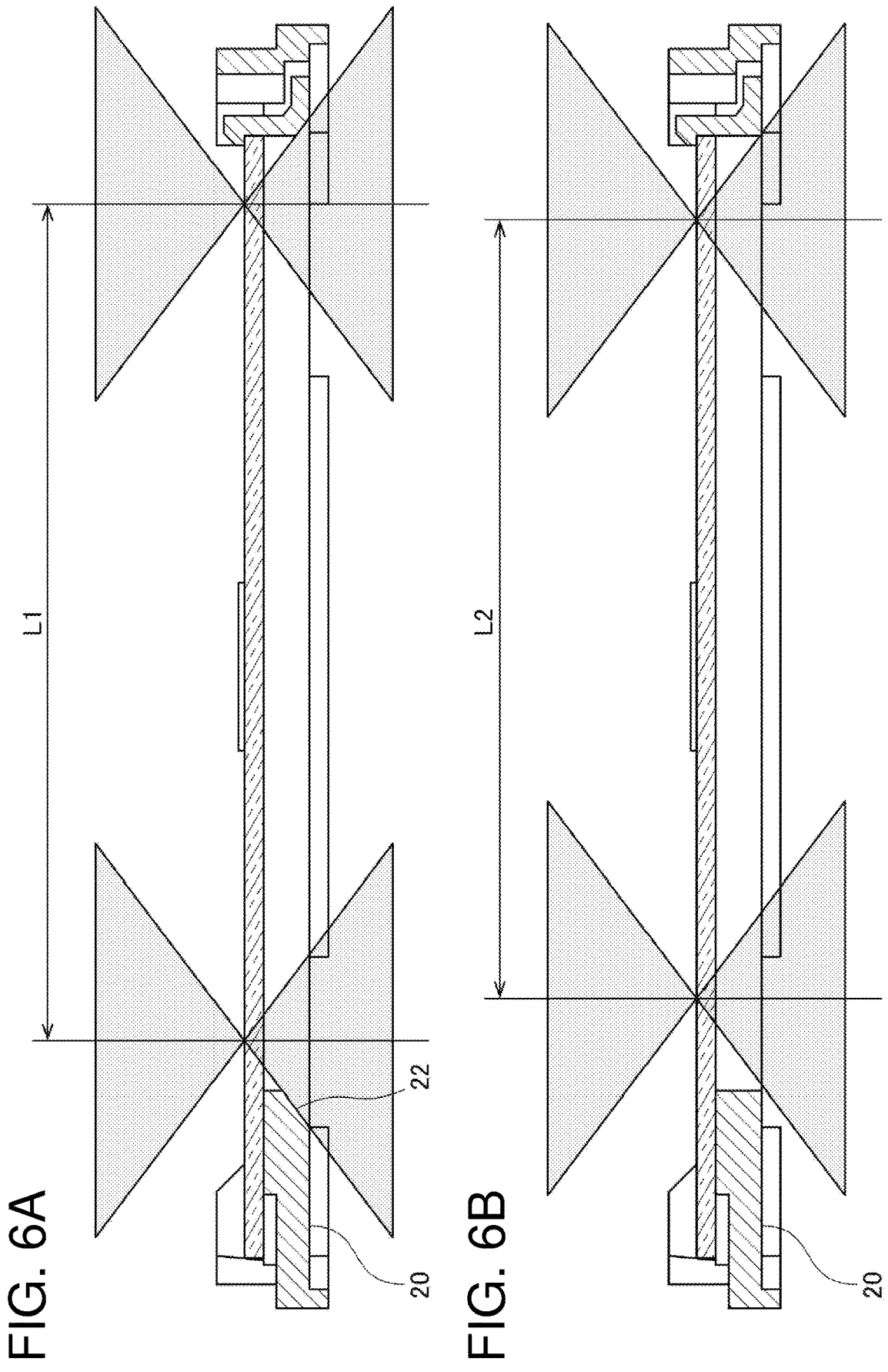
FIG. 6A is a cross-sectional view of the slide holder according to the embodiment holding a glass slide at a time of image capturing.
FIG. 6B is a cross-sectional view of a slide holder according to a comparative example holding a glass slide at a time of image capturing.

FIG. 6A is a cross-sectional view of the slide holder 1 according to the embodiment holding a glass slide 2 at a time of image capturing. FIG. 6B is a cross-sectional view of the slide holder 1 according to a comparative example holding a glass slide 2 at a time of image capturing. As depicted in FIG. 6A, the slide holder 1 according to the embodiment has the tapered surface 22 on the inner periphery side of the bottom surface 20 of at least the first longer side portion 10. Accordingly, it is possible to inhibit interference of irradiation light radiated onto the glass slide 2 with the inner periphery side of the bottom surface 20 of the slide holder 1. The effective imaging range in FIG. 6A is defined as L1.

In contrast to this, the slide holder 1 according to the comparative example depicted in FIG. 6B is different from the embodiment in that there are no tapered surfaces 22 on the inner periphery side of the bottom surfaces 20. Accordingly, in the slide holder 1 according to the comparative example, it becomes more likely for irradiation light radiated onto the glass slide 2 to interfere with the inner periphery side of the bottom surfaces 20 of the slide holder 1. Accordingly, an effective imaging range L2 according to the comparative example depicted in FIG. 6B is narrower than the effective imaging range L1 according to the embodiment.

In a case where the numerical aperture NA is 0.5, the maximum incident angle θ is 30 degrees. In a case where the numerical aperture NA is 0.6, the maximum incident angle θ is 36.9 degrees. In a case where the numerical aperture NA is 0.7, the maximum incident angle θ is 44.4 degrees. In a case where the numerical aperture NA is 0.8, the maximum incident angle θ is 53.1 degrees.

An angle α formed by the bottom surfaces 20 and the tapered surfaces 22 is (90-θ) degrees. Accordingly, the inclination angle of the tapered surfaces 22 is preferably set taking into consideration the maximum incident angle θ determined by the numerical aperture NA of the objective lens 40 such that the angle α formed by the bottom surfaces 20 and the tapered surfaces 22 becomes equal to or smaller than (90-θ) degrees. The angle α formed by the bottom surfaces 20 and the tapered surfaces 22 is equal to or smaller than 60 degrees, for example.

Figure 7:
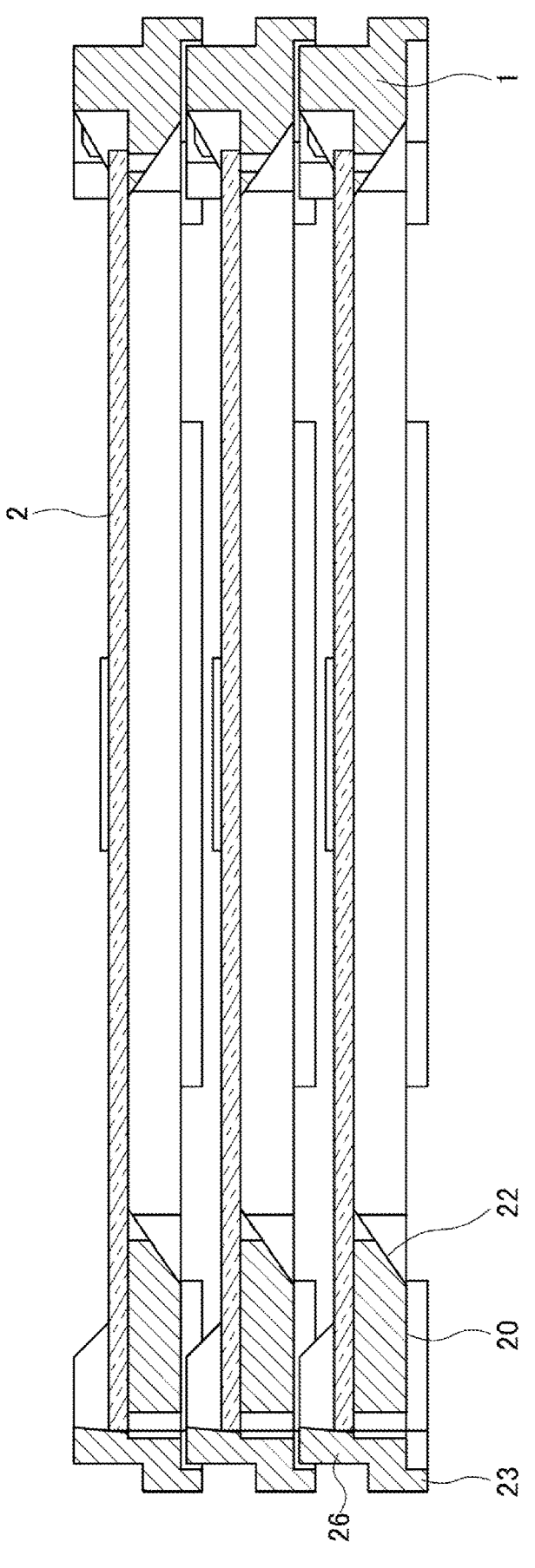
FIG. 7 is a cross-sectional view taken along line B-B in FIG. 1 in a state where a plurality of slide holders according to the modification example are stacked one on another.
Figure 8:
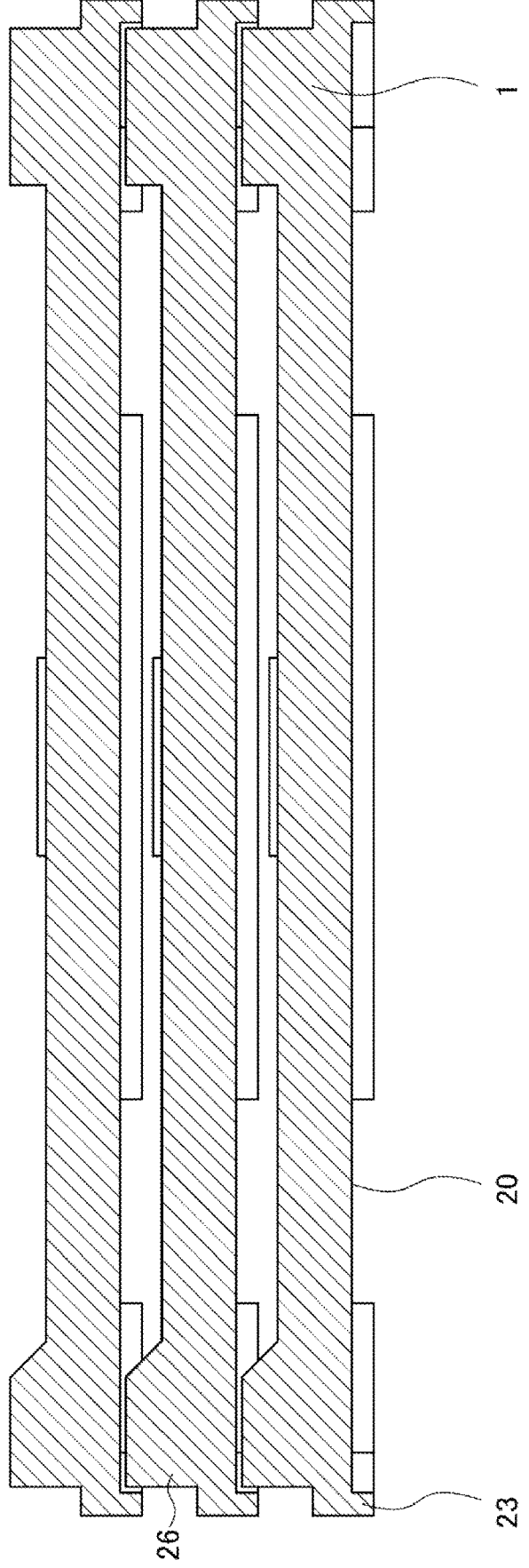
FIG. 8 is a cross-sectional view taken along line C-C in FIG. 1 in a state where a plurality of slide holders according to the modification example are stacked one on another.

Next, with reference to FIG. 7 and FIG. 8, a state where the slide holders 1 according to the embodiment are stacked one on another is explained. FIG. 7 is a cross-sectional view taken along line B-B in FIG. 1 in a state where a plurality of the slide holders 1 according to the modification example are stacked one on another. FIG. 8 is a cross-sectional view taken along line C-C in FIG. 1 in a state where a plurality of the slide holders 1 according to the modification example are stacked one on another.

As mentioned above, in the frame-shaped slide holder 1, each protrusion 26 has an outline shape smaller than the corresponding wall portion 23. Accordingly, as depicted in FIG. 7 and FIG. 8, the protrusions 26 protruding above the slide holders 1 are positioned on the inner periphery side of the downwardly extending wall portions 23 of the slide holders 1 that are stacked from above. The height of the protrusions 26 is taller than the thickness of the glass slides 2. Thereby, the slide holders 1 holding the glass slides 2 can be stacked one on another.

The length, width and thickness of the glass slides 2 are 76 mm, 26 mm and 0.8 mm to 1.5 mm, respectively, for example. The length, width and height of the outline shape of the slide holders 1 that can hold four of the glass slides 2 that are placed next to each other are 127.76 mm, 85.48 mm and 7.5 mm, respectively, for example. The outline shape of the slide holders 1 may be an outline shape conforming to typical ANSI/SBS standards for 96 well plates and the like, for example.

Note that the size of the slide holders 1 can be changed as appropriate depending on glass slides 2 to be held. In particular, the height of the slide holders 1 can be changed as appropriate as long as glass slides 2 do not stick out above the slide holder 1 in a state where the slide holders 1 hold the glass slides 2. In addition, in a case where large-sized glass slides 2 to be used for pathological section specimens are used, each slide holder 1 may hold two of the large-sized glass slide 2 in a state where they are placed next to each other.

Figure 9:
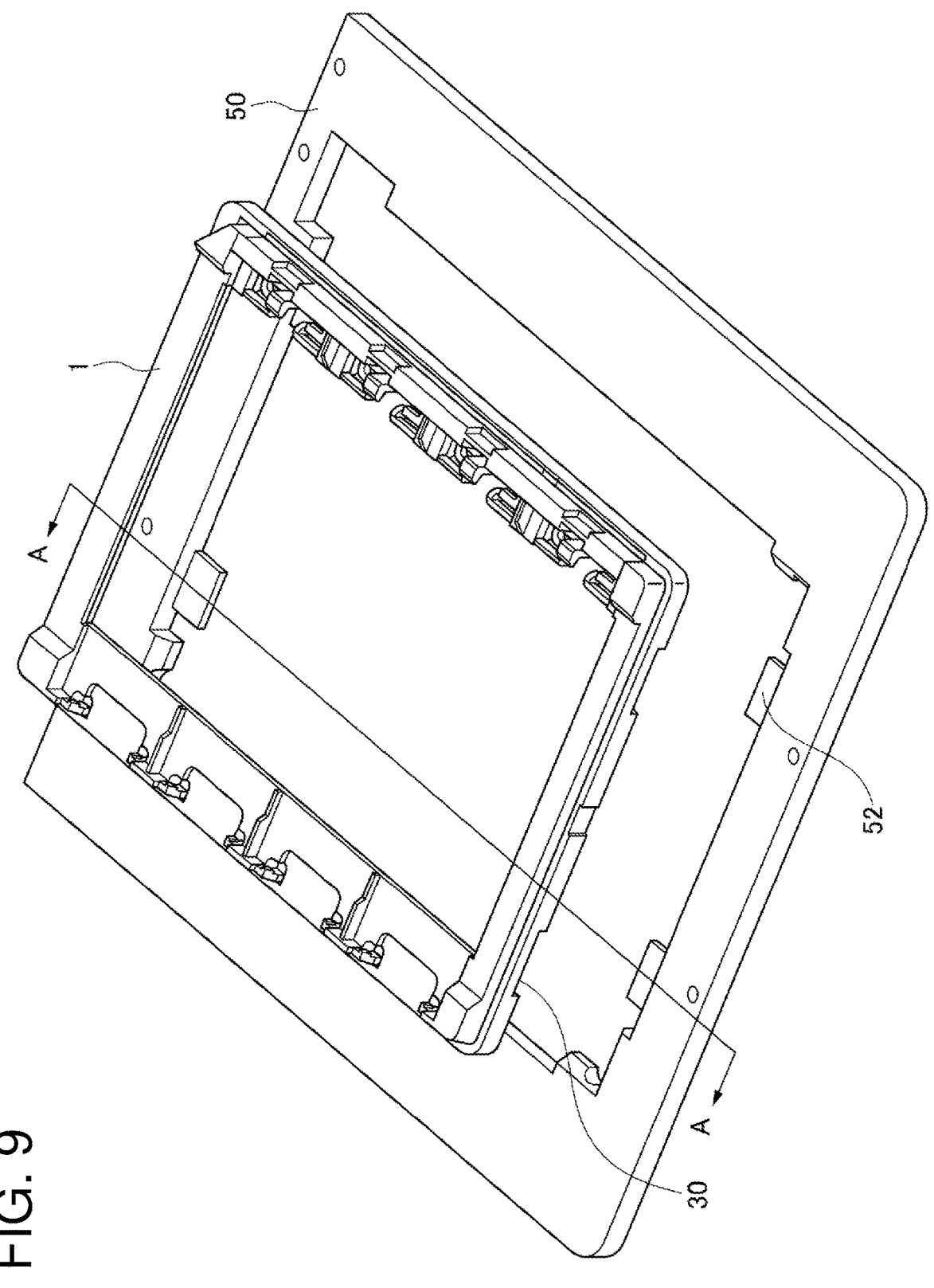
FIG. 9 is a perspective view of a stage on which the slide holder is placed.
Figure 10:
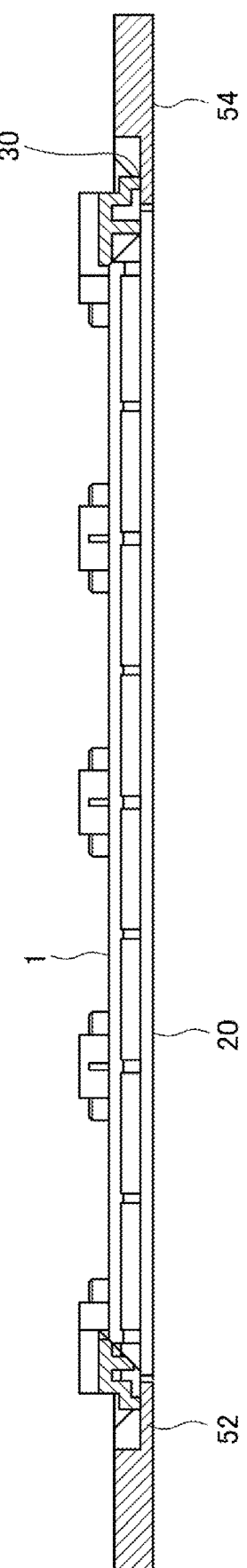
FIG. 10 is a cross sectional view taken along line A-A in FIG. 9.

Next, with reference to FIG. 9 and FIG. 10, a stage 50 on which the slide holder 1 according to the embodiment is placed is explained. FIG. 9 is a perspective view of the stage 50 on which the slide holder 1 is placed. FIG. 10 is a cross sectional view taken along line A-A in FIG. 9.

The stage 50 has a frame-shaped outline shape larger than the slide holder 1. The frame-shaped stage 50 has support sections 52 at its inner periphery. The support sections 52 are provided at positions corresponding to the recesses 30 of the slide holder 1. Thereby, the support sections 52 support the slide holder 1 at the recesses 30.

As depicted in FIG. 10, the bottom surfaces 20 of the slide holder 1 and a bottom surface 54 of the stage 50 preferably coincide with each other in a state where the slide holder 1 is placed on the stage 50. Thereby, it is possible to inhibit optical interference of the objective lens 40 or the transmission illumination system 42 with the slide holder 1 or the stage 50 at a time of image capturing.

Figure 11:
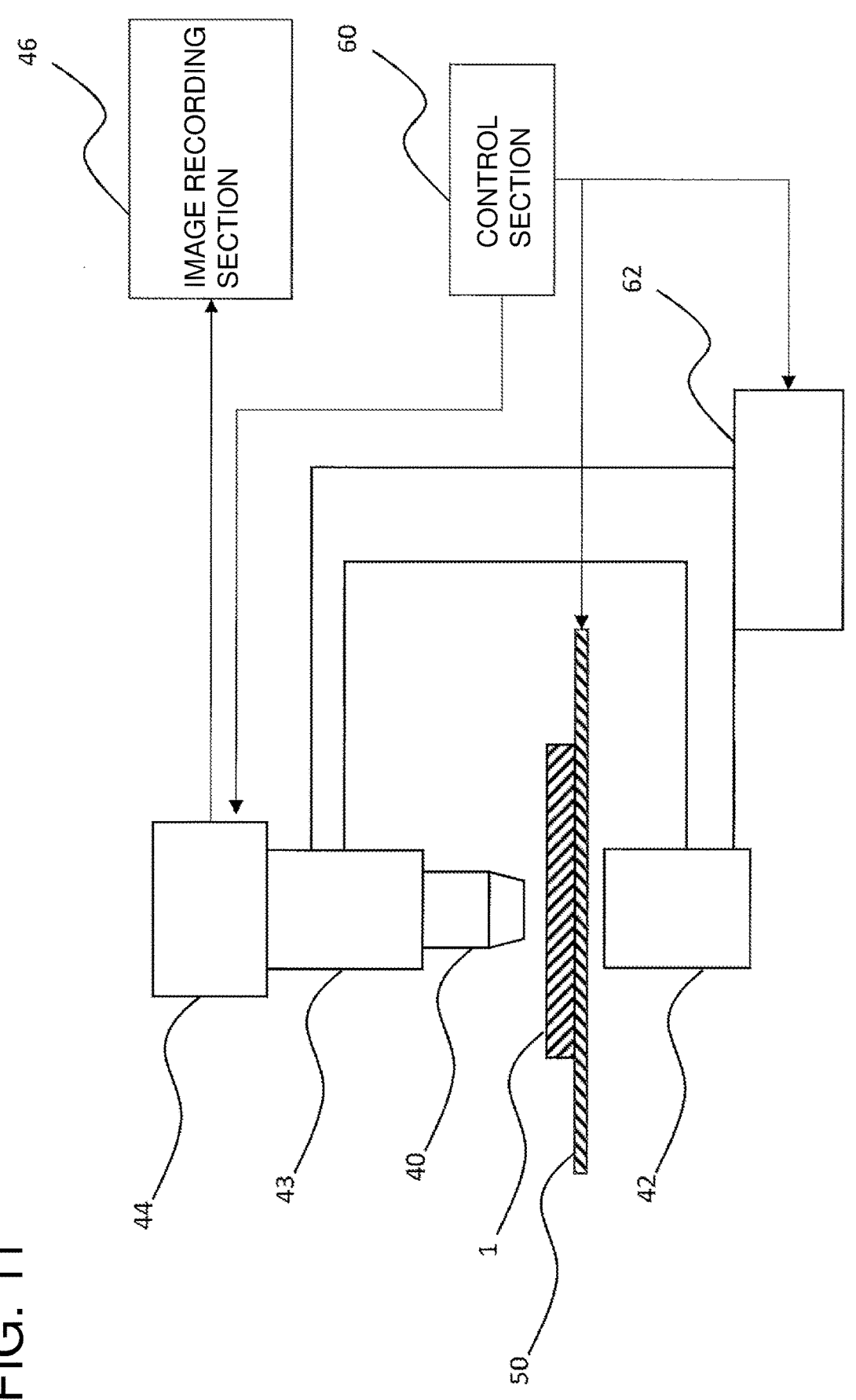
FIG. 11 is a schematic configuration diagram of a microscope system.

Next, with reference to FIG. 11, a microscope system is explained. FIG. 11 is a schematic configuration diagram of the microscope system. The microscope system has the stage 50, the objective lens 40, an imaging optical system 43, an image capturing section 44, an image recording section 46, the transmission illumination system 42, a control section 60 and a microscope stage 62.

An image observed by the objective lens 40 is captured by the image capturing section 44. The image capturing section 44 is a camera, for example. Image data obtained by image-capturing by the image capturing section 44 is recorded in the image recording section 46.

Each of the image recording section 46 and the control section 60 may be configured by using a computer or a microcontroller having a CPU, a memory, a non-volatile storage device (SSD, etc.) and a logical circuit such as an FPGA, for example, or may be configured by giving one computer or microcontroller the functions of both the image recording section 46 and the control section 60.

The control section 60 controls image capturing timing of the image capturing section 44. In addition, the control section 60 can control movement of the stage 50 and the microscope stage 62. Here, the slide holder 1 placed on stage 50 may be moved to an image capturing position or an image capturing position may be moved by moving the microscope stage 62 while the stage 50 is fixed. Thereby, images at a plurality of image capturing positions on the glass slide 2 can be captured consecutively.

Note that in order to capture images of a plurality of the glass slides 2 simultaneously, two or more objective lenses 40, imaging optical systems 43 and image capturing sections 44 may be arranged in parallel, and connected with a single image recording section 46 or a plurality of image recording sections 46.

A plurality of the stacked slide holders 1 are stored in a plate stacker (not depicted) in a state where the plurality of glass slides 2 are held by the plurality of slide holders 1. The plate stacker can automatically take out the slide holders 1 one at a time from the plurality of stacked slide holders 1.

A slide holder 1 taken out from the plate stacker is placed on the stage 50.

Note that the slide holders 1 may be placed on the stage 50 one at a time without using the plate stacker.

The slide holders and the stage according to the present invention have been explained in detail thus far, but the present invention is not limited to the embodiment described above. In addition, various improvements or changes may certainly be made within the scope not departing from the gist of the present invention.

REFERENCE SIGNS LIST

1: Slide holder
2: Glass slide
10: First longer side portion
12: Second longer side portion
14: First shorter side portion
16: Second shorter side portion
18: Elastic portion
19: Projection
20: Bottom surface
21: Glass slide placement surface
22: Tapered surface
23: Wall portion
24: Pedestal portion
26: Protrusion
28: Claw
30: Recess
32: Rib
40: Objective lens
42: Transmission illumination system
43: Imaging optical system
44: Image capturing section
46: Image recording section
50: Stage
52: Support section
54: Bottom surface
60: Control section
62: Microscope stage
L1: Effective imaging range
L2: Effective imaging range

The invention claimed is:

1. A slide holder that can hold a plurality of glass slides, the slide holder comprising:

a first longer side portion that has elastic portions that fix the glass slides, and has a tapered surface on an inner periphery side of a bottom surface;

a second longer side portion that is positioned opposite the first longer side portion; and a first shorter side portion and a second shorter side portion that connect ends of the first longer side portion and the second longer side portion, and are positioned opposite to each other, wherein each of the first longer side portion, the second longer side portion, the first shorter side portion and the second shorter side portion has:

a pedestal portion that has a downwardly extending wall portion at the bottom surface; and a protrusion that protrudes upward from the pedestal portion and is positioned on an inner periphery side of the wall portion.

2. The slide holder according to claim 1, wherein the elastic portions can bias the glass slides in a direction from the first longer side portion to the second longer side portion.

3. The slide holder according to claim 2, wherein
the first longer side portion has a glass slide placement surface on an upper surface, and
the elastic portions are spring structures overhanging from the glass slide placement surface.

4. The slide holder according to claim 2, wherein each of the second longer side portion, the first shorter side portion and the second shorter side portion has a tapered surface on the inner periphery side of the bottom surface.

5. The slide holder according to claim 2, wherein an angle formed by the tapered surface and the bottom surface of each of the first longer side portion, the second longer side portion, the first shorter side portion and the second shorter side portion is equal to or smaller than 60 degrees.

6. The slide holder according to claim 2, wherein the first longer side portion including the elastic portions, the second longer side portion, the first shorter side portion and the second shorter side portion are formed integrally.

7. The slide holder according to claim 1, wherein
the first longer side portion has a glass slide placement surface on an upper surface, and
the elastic portions are spring structures overhanging from the glass slide placement surface.

8. The slide holder according to claim 7, wherein each of the second longer side portion, the first shorter side portion and the second shorter side portion has a tapered surface on the inner periphery side of the bottom surface.

9. The slide holder according to claim 7, wherein an angle formed by the tapered surface and the bottom surface of each of the first longer side portion, the second longer side portion, the first shorter side portion and the second shorter side portion is equal to or smaller than 60 degrees.

10. The slide holder according to claim 7, wherein the first longer side portion including the elastic portions, the second longer side portion, the first shorter side portion and the second shorter side portion are formed integrally.

11. The slide holder according to claim 1, wherein each of the second longer side portion, the first shorter side portion and the second shorter side portion has a tapered surface on the inner periphery side of the bottom surface.

12. The slide holder according to claim 11, wherein an angle formed by the tapered surface and the bottom surface of each of the first longer side portion, the second longer side portion, the first shorter side portion and the second shorter side portion is equal to or smaller than 60 degrees.

13. The slide holder according to claim 1, wherein an angle formed by the tapered surface and the bottom surface of each of the first longer side portion, the second longer side portion, the first shorter side portion and the second shorter side portion is equal to or smaller than 60 degrees.

14. The slide holder according to claim 1, wherein the first longer side portion including the elastic portions, the second longer side portion, the first shorter side portion and the second shorter side portion are formed integrally.

15. The slide holder according to claim 14, wherein the first longer side portion including the elastic portions, the second longer side portion, the first shorter side portion and the second shorter side portion are injection-molded.

16. The slide holder according to claim 1, wherein the first longer side portion including the elastic portions, the second longer side portion, the first shorter side portion and the second shorter side portion are made of resin.

17. The slide holder according to claim 1, wherein a height of the protrusion is taller than a thickness of the glass slides.

18. The slide holder according to claim 1, wherein at least one of the first longer side portion, the second longer side portion, the first shorter side portion and the second shorter side portion has a recess at the wall portion.

19. A slide-holder support structure on which the slide holder according to claim 18 can be placed on a frame-shaped stage, wherein the slide-holder support structure has, on an inner periphery, a support section that supports the slide holder at the recess, and in a state where the slide holder is placed, the bottom surface of the slide holder and the bottom surface of the stage coincide with each other.

\* \* \* \* \*